(12) United States Patent
Watson

(10) Patent No.: US 10,842,140 B1
(45) Date of Patent: Nov. 24, 2020

(54) FISHING LURE SYSTEM

(71) Applicant: Jesse Watson, Waxahachie, TX (US)

(72) Inventor: Jesse Watson, Waxahachie, TX (US)

( * ) Notice: Subject to any disclaimer, the term of this patent is extended or adjusted under 35 U.S.C. 154(b) by 449 days.

(21) Appl. No.: 15/655,103

(22) Filed: Jul. 20, 2017

Related U.S. Application Data

(60) Provisional application No. 62/412,705, filed on Oct. 25, 2016.

(51) Int. Cl.
*A01K 85/00* (2006.01)
*A01K 85/16* (2006.01)
*A01K 85/18* (2006.01)

(52) U.S. Cl.
CPC ............. *A01K 85/16* (2013.01); *A01K 85/18* (2013.01); *A01K 85/00* (2013.01)

(58) Field of Classification Search
CPC .................................. A01K 85/00; A01K 85/16
USPC ........................ 43/42.47, 42.39, 42.45, 42.48
See application file for complete search history.

(56) References Cited

U.S. PATENT DOCUMENTS

| | | | | | |
|---|---|---|---|---|---|
| 1,791,316 | A | * | 2/1931 | Jordan | A01K 85/18 |
| | | | | | 43/42.15 |
| 1,997,900 | A | * | 4/1935 | Edwards | A01K 85/16 |
| | | | | | 43/42.15 |
| 1,999,522 | A | * | 4/1935 | Van Houten | A01K 85/16 |
| | | | | | 43/42.06 |
| 2,025,270 | A | * | 12/1935 | Chaney | A01K 85/16 |
| | | | | | 43/42.47 |
| 2,218,280 | A | * | 10/1940 | Deering | A01K 85/16 |
| | | | | | 43/42.26 |
| 2,246,413 | A | * | 6/1941 | Haselwood | A01K 85/16 |
| | | | | | 43/42.48 |
| 2,290,512 | A | * | 7/1942 | Weesner | A01K 85/16 |
| | | | | | 43/42.09 |
| 2,333,590 | A | * | 11/1943 | Schueller | A01K 85/16 |
| | | | | | 43/42.05 |
| D154,109 | S | * | 6/1949 | Espey et al. | D22/133 |

(Continued)

FOREIGN PATENT DOCUMENTS

| | | | |
|---|---|---|---|
| FR | 2667760 A1 * | 4/1992 | ............. A01K 85/16 |
| JP | 10108591 A * | 4/1998 | |

(Continued)

OTHER PUBLICATIONS

Translation of JP 2001-103872 (Year: 2001).*

*Primary Examiner* — Darren W Ark

(57) ABSTRACT

A fishing lure system includes an elongated body with a front end and a tail end; a weight, embedded within the tail end of the body; a hook, located at the tail end and having a shank, connecting the hook to the top of the body, and a barb, connected to the shank and extended above the body; an inverted bill, secured at the front end of the body at a connection point and extending substantially upward from the connection point on the body; a line attachment point, secured at the head end of the body and below the inverted bill; the tension applied by the line causes the tail end to rise, positioning the body in a horizontal position mimicking the movement of a natural prey; the release of tension by the line allow the tail end to fall, causing the body to become substantially vertical; and the inverted bill causes resistance when the tail end falls, slowing the fall to further mimic the movement of natural prey such as a crawfish.

2 Claims, 2 Drawing Sheets

(56) References Cited

U.S. PATENT DOCUMENTS

| | | | | |
|---|---|---|---|---|
| 2,523,949 A * | 9/1950 | Gambill | A01K 85/16 43/42.28 |
| 2,557,516 A * | 6/1951 | Schipper | A01K 85/16 43/42.39 |
| 2,561,515 A * | 7/1951 | Keeler | A01K 85/16 43/42.5 |
| 2,570,338 A * | 10/1951 | Gambill | A01K 85/16 43/42.35 |
| 2,596,474 A * | 5/1952 | Espey | A01K 85/16 43/42.44 |
| 2,621,439 A * | 12/1952 | Leidel | A01K 85/16 43/42.48 |
| 2,685,145 A * | 8/1954 | Dean | A01K 85/18 43/42.15 |
| 2,714,779 A * | 8/1955 | Heiner | A01K 85/16 43/42.23 |
| 2,760,294 A * | 8/1956 | Morrill, Jr. | A01K 85/16 43/42.45 |
| 2,787,076 A * | 4/1957 | Kring | A01K 85/16 43/42.16 |
| 2,994,982 A * | 8/1961 | Murawski | A01K 85/02 43/35 |
| 3,044,207 A * | 7/1962 | Dorsett | A01K 85/16 43/42.31 |
| 3,389,490 A * | 6/1968 | Peters | A01K 85/16 43/42.1 |
| 3,727,339 A * | 4/1973 | Le Master | A01K 85/16 43/42.22 |
| 4,052,809 A * | 10/1977 | Reinhardt | A01K 85/16 43/42.22 |
| 4,141,171 A * | 2/1979 | Muddiman | A01K 85/16 43/42.39 |
| 4,471,556 A * | 9/1984 | Dworski | A01K 85/16 43/42.23 |
| 4,771,567 A * | 9/1988 | Cannon | A01K 85/00 43/42.26 |
| 5,115,592 A * | 5/1992 | Renaud | A01K 85/16 43/42.47 |
| 5,119,581 A * | 6/1992 | Rudolph | A01K 85/16 43/42.22 |
| 5,168,652 A * | 12/1992 | Davis | A01K 85/16 43/42.23 |
| 5,170,579 A * | 12/1992 | Hollinger | A01K 85/16 43/42.06 |
| 5,216,830 A * | 6/1993 | Brott, II | A01K 85/00 43/42.39 |
| 5,228,230 A * | 7/1993 | Vaught | A01K 85/00 43/42.26 |
| 5,438,790 A * | 8/1995 | Rigney | A01K 85/00 43/42.24 |
| 5,490,347 A * | 2/1996 | Conley | A01K 85/16 43/42.39 |
| 5,537,770 A * | 7/1996 | Storm | A01K 85/16 43/42.22 |
| 5,546,694 A * | 8/1996 | Wilkinson | A01K 85/16 43/42.31 |
| 5,937,569 A * | 8/1999 | Solheim | A01K 85/16 43/42.33 |
| 6,212,818 B1 * | 4/2001 | Huddleston | A01K 85/00 43/42.09 |
| 6,226,918 B1 * | 5/2001 | Rigney | A01K 85/00 43/42.24 |
| 6,374,535 B1 * | 4/2002 | Bailey | A01K 85/16 43/42.11 |
| 6,484,434 B1 * | 11/2002 | Elges | A01K 85/16 43/42.39 |
| 7,114,285 B1 * | 10/2006 | Ince | A01K 85/00 43/42.26 |
| 7,197,846 B1 * | 4/2007 | Gibson | A01K 85/00 43/42.08 |
| 7,260,913 B2 * | 8/2007 | Becker | A01K 85/01 43/17.6 |
| 7,493,725 B2 * | 2/2009 | Sampson | A01K 85/16 43/42.24 |
| 7,497,045 B1 * | 3/2009 | Crowe | A01K 85/00 43/42 |
| 7,621,068 B1 * | 11/2009 | Renosky | A01K 85/01 43/42.03 |
| 7,716,871 B1 * | 5/2010 | Sayers | A01K 85/16 43/42.39 |
| 7,971,387 B2 * | 7/2011 | Huddleston | A01K 85/00 43/44.2 |
| 8,341,870 B2 * | 1/2013 | Dahlberg | A01K 85/16 43/42.1 |
| 8,793,924 B2 * | 8/2014 | Hughes | A01K 85/18 43/42.02 |
| 9,232,777 B2 * | 1/2016 | Sheikh | A01K 85/16 |
| 9,474,257 B1 * | 10/2016 | McGilvry | A01K 85/02 |
| 9,615,552 B2 * | 4/2017 | Budd | A01K 85/16 |
| D837,932 S * | 1/2019 | Brink | A01K 85/00 D22/133 |
| 10,327,428 B2 * | 6/2019 | Shirakawa | A01K 85/18 |
| 2001/0049900 A1 * | 12/2001 | Peck | A01K 85/16 43/42.39 |
| 2002/0050090 A1 * | 5/2002 | Lloyd | A01K 85/16 43/42.22 |
| 2003/0084602 A1 * | 5/2003 | Reed | A01K 85/00 43/42.39 |
| 2004/0049970 A1 * | 3/2004 | Brown | A01K 85/16 43/42 |
| 2005/0039374 A1 * | 2/2005 | Reed | A01K 85/00 43/42.39 |
| 2005/0246940 A1 * | 11/2005 | Jones | A01K 85/00 43/42.5 |
| 2008/0104876 A1 * | 5/2008 | Ito | A01K 85/16 43/42.06 |
| 2010/0175305 A1 * | 7/2010 | Heikkila | A01K 85/16 43/42.39 |
| 2012/0017489 A1 * | 1/2012 | Partridge | A01K 85/16 43/42.39 |
| 2013/0318857 A1 * | 12/2013 | Daniel | A01K 85/00 43/42.09 |
| 2015/0150226 A1 * | 6/2015 | McLeod | A01K 85/01 43/42.06 |
| 2015/0282464 A1 * | 10/2015 | Brink | A01K 85/00 43/4.5 |
| 2016/0330945 A1 * | 11/2016 | Mosher | A01K 85/01 |
| 2018/0000058 A1 * | 1/2018 | Jarboe, Jr. | A01K 85/00 |
| 2018/0014516 A1 * | 1/2018 | Van Reenen | A01K 85/16 |
| 2018/0014517 A1 * | 1/2018 | Coletti | A01K 95/00 |
| 2018/0125047 A1 * | 5/2018 | Gierl | A01K 85/16 |
| 2018/0153147 A1 * | 6/2018 | Laabs | A01K 85/16 |

FOREIGN PATENT DOCUMENTS

| | | | | |
|---|---|---|---|---|
| JP | 10234264 A | * | 9/1998 |
| JP | 11220976 A | * | 8/1999 |
| JP | 11235137 A | * | 8/1999 |
| JP | 11332420 A | * | 12/1999 |
| JP | 2001000078 A | * | 1/2001 |
| JP | 2001103871 A | * | 4/2001 |
| JP | 2001103872 A | * | 4/2001 |
| JP | 2002125522 A | * | 5/2002 |
| JP | 2002272320 A | * | 9/2002 |
| JP | 2003125675 A | * | 5/2003 |
| JP | 2003289761 A | * | 10/2003 |
| JP | 2004275157 A | * | 10/2004 |
| JP | 2004305022 A | * | 11/2004 |
| JP | 2005073664 A | * | 3/2005 |
| JP | 2005087156 A | * | 4/2005 |
| JP | 2006006199 A | * | 1/2006 |
| JP | 2006158368 A | * | 6/2006 |
| JP | 2008067639 A | * | 3/2008 |
| JP | 4636398 B2 | * | 2/2011 |
| JP | 2011172500 A | * | 9/2011 |
| JP | 2012024065 A | * | 2/2012 |
| JP | 2012200255 A | * | 10/2012 |
| JP | 2012231699 A | * | 11/2012 |
| JP | 2014093971 A | * | 5/2014 |

(56) References Cited

FOREIGN PATENT DOCUMENTS

| JP | 2014121285 | A | * | 7/2014 | |
|----|------------|---|---|--------|---|
| JP | 2015019600 | A | * | 2/2015 | |
| JP | 5693252 | B2 | * | 4/2015 | |
| JP | 2017136051 | A | * | 8/2017 | |
| JP | 2018143224 | A | * | 9/2018 | |
| WO | WO-9421112 | A1 | * | 9/1994 | ............ A01K 85/16 |
| WO | WO-2015153941 | A1 | * | 10/2015 | |

* cited by examiner

FISHING LURE SYSTEM

BACKGROUND

1. Field of the Invention

The present invention relates generally to outdoor recreation systems, and more specifically, to a fishing lure system for mimicking the movement of natural prey.

2. Description of Related Art

Fishing lure systems are well known in the art and are effective means to bait and catch fish. For example, FIG. 1 depicts a conventional fishing lure system 101 having a body 103 with one or more hooks 105 dangling from the body 103, and a line connection ring 107. During use, a line 109 is attached to the ring 107 and the body 103 is pulled through water.

One of the problems commonly associated with system 101 is unnatural movement and appearance. For example, the body 103 moves substantially smoothly through water, unlike natural prey which move in an up and down motion.

In addition, the hooks 105 are prone to snagging vegetation within water.

Accordingly, although great strides have been made in the area of fishing lure systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
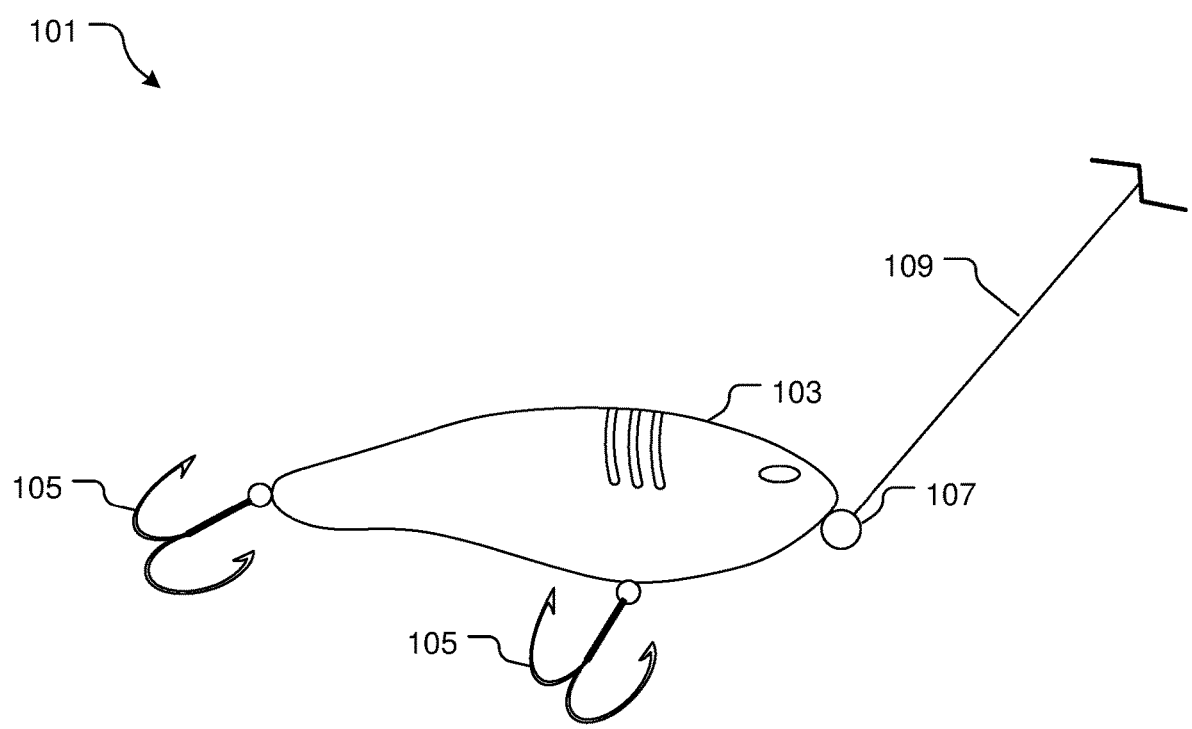
FIG. 1 is a side view of a common fishing lure system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional fishing lure systems. Specifically, the present invention improves natural prey imitation. In addition, the present invention reduces vegetation snagging. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
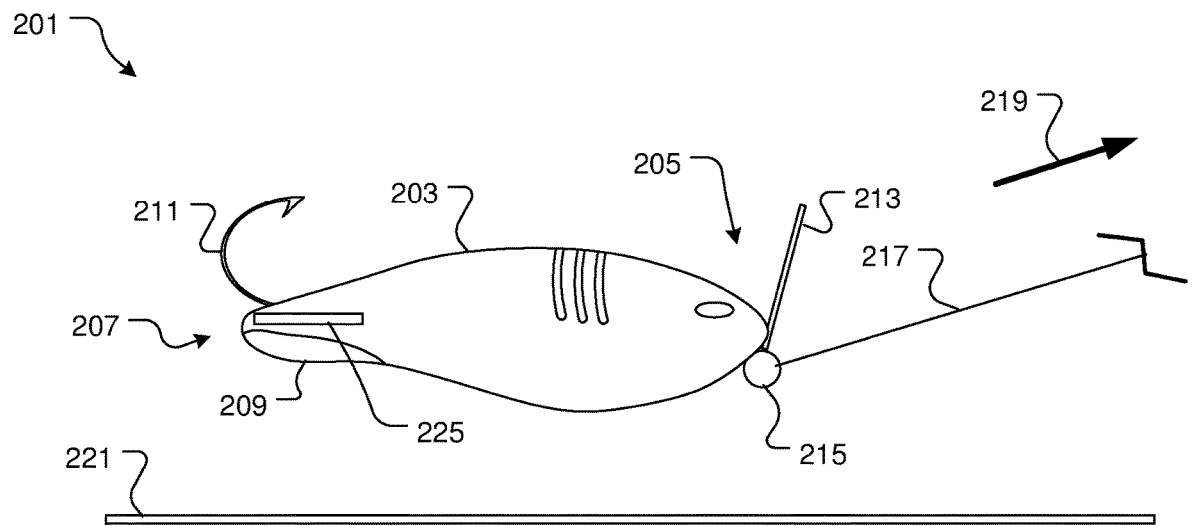
FIGS. 2A and 2B are side views of a fishing lure system in accordance with a preferred embodiment of the present application with tension applied and released respectively.
Figure 2B:
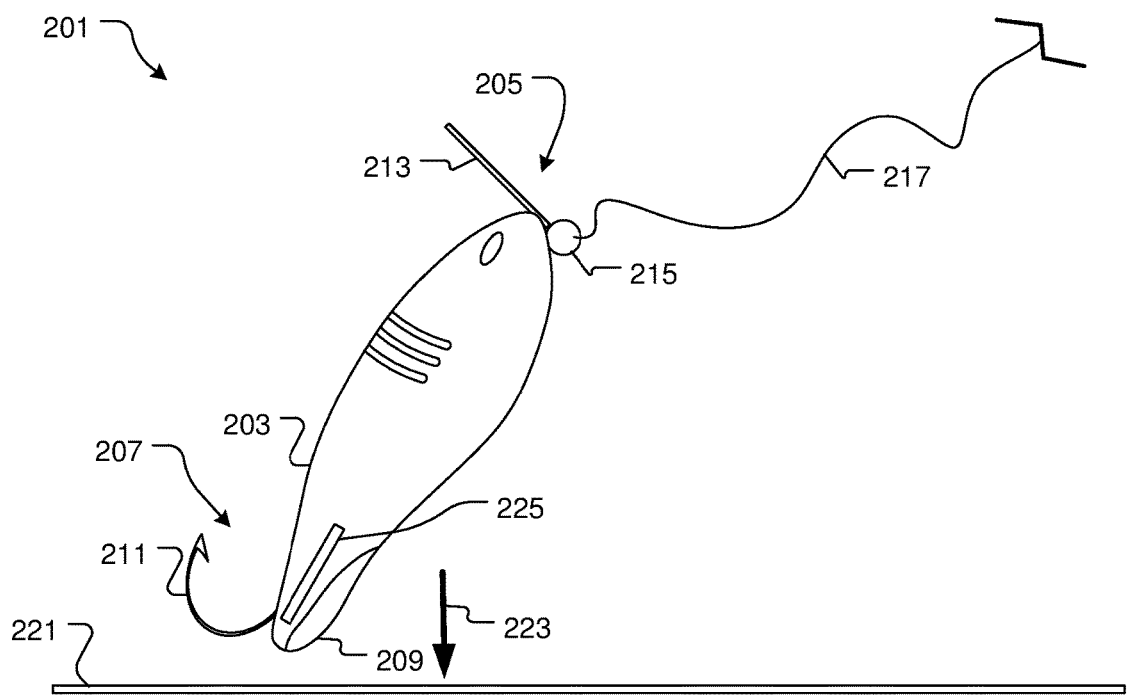

Referring now to the drawings wherein like reference characters identify corresponding or similar elements throughout the several views, FIGS. 2A and 2B depict side views of a fishing lure system in accordance with a preferred embodiment of the present application. It will be appreciated that system 201 overcomes one or more of the above-listed problems commonly associated with conventional fishing lure systems.

In the contemplated embodiment, system 201 includes an elongated body 203 with a front end 205 and a tail end 207, and a weight 209 secured within the tail end 207, a hook 211 secured on top of the body 203 at the tail end 207, and an inverted bill 213 secured to the front end 205 and extending substantially upward from the body 203. In addition, system 201 includes a line attachment point 215, located below the inverted bill 213 at the front end 205.

During use, a fishing line 217 is secured to the line attachment point 215. When tension is applied to the line 217, as shown with arrow 219, the tail end 207 rises, positioning the body 203 in a substantially parallel position such as a natural prey would. When tension is released, as shown in FIG. 2B, the weight 209 causes the tail end 207 to drop toward the water body floor 221, as demonstrated with arrow 223. During the tail drop, the inverted bill 213 creates resistance in the water, slowing the fall of the tail and thereby mimicking the movement of natural prey such as a crawfish.

It should be appreciated that one of the unique features believed characteristic of the present application is the inverted bill 213. It should be appreciated that the resistance caused by the inverted bill 213 improves the natural appearance of system 201 within water.

It should be appreciated that the location of the hook 211 on top of the body reduces the snagging of the hook 211 on vegetation. It is further contemplated that system 201 can include a tail fin 225, and the body 203 can vary in size, color, and material as aesthetic, functional, or manufacturing considerations require.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A fishing lure system, comprising:
an elongated body extending from a front end to a tail end, the tail end having a top surface and a bottom surface;
a weight embedded within the tail end of the body, the weight positioned at the bottom surface of the tail end;
a hook located at the tail end, the hook having:
    a shank connecting the hook to the top surface of the elongated body, the shank extending in a direction away from the weight; and
    a barb, connected to the shank and extending above the body;
an inverted bill secured to and extending from the front end of the elongated body at a connection point and extending substantially upward from the connection point on the body and in a direction away from the weight;
a line attachment point for attachment of a line secured at the front end of the elongated body and below the inverted bill; and
a tail fin secured to the tail end of the body and positioned between the weight and the shank, the tail fin extending parallel to a longitudinal axis of the elongated body;
wherein tension applied by the line causes the tail end to rise, thereby positioning the body in a horizontal position as a natural prey would;
wherein release of tension by the line allows the tail end to fall, thereby causing the body to become substantially vertical; and
wherein the inverted bill causes resistance when the tail end falls, thereby slowing the fall to mimic a movement of the natural prey.

2. The system of claim 1, wherein the line attachment point is a ring.

* * * * *